United States Patent
Polster et al.

(10) Patent No.: US 9,011,562 B2
(45) Date of Patent: Apr. 21, 2015

(54) METHOD FOR OPERATING A REFORMER FURNACE AND REFORMING PLANT

(75) Inventors: Bernd Polster, Frankfurt am Main (DE); Alexander Roesch, Darmstadt (DE); Matthew Shaver, Houston, TX (US); Dieter Ulber, Steinbach (DE); Ulrich Wolf, Egelsbach (DE)

(73) Assignee: Air Liquide Global E&C Solutions Germany GmbH, Frankfurt am Main (DE)

( * ) Notice: Subject to any disclaimer, the term of this patent is extended or adjusted under 35 U.S.C. 154(b) by 503 days.

(21) Appl. No.: 13/516,341

(22) PCT Filed: Dec. 8, 2010

(86) PCT No.: PCT/EP2010/007460
§ 371 (c)(1), (2), (4) Date: Jun. 15, 2012

(87) PCT Pub. No.: WO2011/072815
PCT Pub. Date: Jun. 23, 2011

(65) Prior Publication Data
US 2012/0256132 A1    Oct. 11, 2012

(30) Foreign Application Priority Data

Dec. 16, 2009  (DE) .......................... 10 2009 058 687
May 12, 2010  (DE) .......................... 10 2010 020 406

(51) Int. Cl.
*C01B 3/32* (2006.01)
*C01B 3/38* (2006.01)

(52) U.S. Cl.
CPC ......... *C01B 3/384* (2013.01); *C01B 2203/0233* (2013.01); *C01B 2203/0816* (2013.01); *C01B 2203/0822* (2013.01); *C01B 2203/0894* (2013.01)

(58) Field of Classification Search
USPC .................. 48/61, 197 R; 423/644; 422/625
See application file for complete search history.

(56) References Cited

U.S. PATENT DOCUMENTS

| | | | |
|---|---|---|---|
| 3,958,951 A | 5/1976 | Woebcke et al. | |
| 2006/0000141 A1* | 1/2006 | Kuwabara et al. | 48/127.9 |
| 2008/0035889 A1 | 2/2008 | Steynberg | |
| 2009/0180949 A1 | 7/2009 | Cui et al. | |
| 2009/0232729 A1* | 9/2009 | Genkin et al. | 423/651 |
| 2010/0074839 A1* | 3/2010 | Drnevich et al. | 423/655 |

FOREIGN PATENT DOCUMENTS

| | | |
|---|---|---|
| DE | 2513499 A1 | 10/1975 |
| DE | 2616085 A1 | 10/1976 |
| EP | 2103568 A2 | 9/2009 |
| EP | 2103569 A2 | 9/2009 |
| GB | 1549736 A | 8/1979 |
| WO | WO 2005082776 A2 | 9/2005 |

OTHER PUBLICATIONS

Ullmann's Encyclopedia of Industrial Chemistry, Sixth Edition, 1998 Electronic Release, keyword "Gas Production", p. 1.
Grant et al., Hydrocarbon Engineering (2001), 6(8), p. 1.

\* cited by examiner

*Primary Examiner* — Matthew Merkling
(74) *Attorney, Agent, or Firm* — Leydig, Voit & Mayer, Ltd.

(57) ABSTRACT

A method for producing a synthesis-gas product gas and a vapor stream includes catalytic steam reforming a hydrocarbonaceous feedstock in a steam reformer. The hot synthesis-gas product gas stream is cooled in a heat exchanger to form a cooled synthesis-gas product gas stream and a first partial vapor stream, which is supplied to the product vapor stream. The reforming furnace is operated so as to burn a burner feedstock in burners, cool a hot flue gas stream from the burners in a heat exchanger to form a cooled flue gas stream and a second partial vapor stream, and separate the cooled flue gas stream into a waste gas stream and a flue gas recirculation stream. The flow of the recirculated flue gas is increased with decreasing flow of the synthesis-gas product gas to obtain an approximately constant product vapor stream by increasing the second partial vapor stream.

20 Claims, No Drawings

METHOD FOR OPERATING A REFORMER FURNACE AND REFORMING PLANT

CROSS REFERENCE TO RELATED APPLICATIONS

This application is a U.S. National Phase application under 35 U.S.C. §371 of International Application No. PCT/EP2010/007460, filed on Dec. 8, 2010, and claims benefit to German Patent Application Nos. DE 10 2009 058 687.3, filed on Dec. 16, 2009 and DE 10 2010 020 406.4, filed on May 12, 2010. The International Application was published in German on Jun. 23, 2011 as WO 2011/072815 A1 under PCT Article 21 (2).

FIELD

The present invention relates to a method for operating a reformer furnace in a way which allows optimum flexibility with respect to the product vapor obtained as a secondary product of the steam reformation of hydrocarbons. The present invention furthermore relates to a plant for carrying out this method.

BACKGROUND

By means of steam, hydrocarbons can catalytically be converted to synthesis gas, i.e. mixtures of hydrogen ($H_2$) and carbon monoxide (CO). As is explained in Ullmann's Encyclopedia of Industrial Chemistry, Sixth Edition, 1998 Electronic Release, keyword "Gas Production", this so-called steam reformation is the most frequently used method for the production of synthesis gas, which subsequently can be converted to further important basic chemicals such as methanol or ammonia. Although different hydrocarbons, such as naphtha, liquefied gas or refinery gases, can be converted, steam reforming with methane-containing natural gas is dominant.

The steam reformation of natural gas is strongly endothermal. Therefore, it is carried out in a reformer furnace in which numerous catalyst-containing reformer tubes are arranged in parallel, in which the steam reforming reaction takes place. The outer walls of the reformer furnace are lined or provided with several layers of refractory material which withstands temperatures up to 1200° C. The reformer tubes mostly are fired by means of burners which are mounted on the upper or lower surface of the reformer furnace and directly fire the space between the reformer tubes. The heat transfer to the reformer tubes is effected by thermal radiation and convective heat transmission of the hot flue gases.

After preheating by heat exchangers or fired heaters to about 500° C., the hydrocarbon-steam mixture enters into the reformer tubes after final heating to about 500 to 800° C. and is converted there at the reforming catalyst to obtain carbon monoxide and hydrogen. Nickel-based reforming catalysts are widely used. While higher hydrocarbons are completely converted to carbon monoxide and hydrogen, a partial conversion usually is effected in the case of methane. The composition of the product gas is determined by the reaction equilibrium; beside carbon monoxide and hydrogen, the product gas therefore also contains non-converted methane and steam.

After leaving the reformer furnace, the hot synthesis-gas product gas is cooled in one or more heat exchangers by indirect heat exchange against a stream of water. The stream of water is evaporated and can be released as high-pressure steam to loads inside and outside the reforming plant. In the last-mentioned case, the vapor stream released is referred to as export steam. On cooling of the hot flue gases, further high-pressure steam is obtained, which likewise can be released as export steam. The partly cooled synthesis-gas product gas subsequently undergoes further conditioning steps which are dependent on the type of product desired or on the succeeding process.

In an efficient way, steam reforming plants therefore produce two main products, namely synthesis gas and a product vapor stream possibly consisting of several partial vapor streams, which wholly or partly is released as export steam. The loads consuming the synthesis gas product (e.g. hydrogen generation, oxosynthesis, generation of CO) typically are not identical with the loads consuming the export steam. It is disadvantageous that discrepancies therefore can occur between the synthesis gas production and the consumption of the export steam, since the production rates of the two products synthesis gas and product vapor are coupled to each other and the production rate of the export steam only can be adapted to a very small extent. In particular in partial load operation of the steam reformer, the export steam quantity committed to external loads possibly cannot be maintained. Furthermore, it may be desirable to temporarily lower the export steam quantity to be released, for example in the case of the shutdown of a plant or in partial load operation of consuming plants.

Methods for the steam reformation of methane therefore have been described already, in which it has been attempted to achieve an uncoupling of the export steam production from the synthesis gas production. The European Patent Application EP 2103568 A2 for example describes a method for the steam reformation of methane, in which virtually no export steam is released to external loads. This is achieved in that on the one hand virtually the entire steam produced is consumed in the reforming process itself. On the other hand, the steam generation for example is minimized in that the fuel is burnt in the reformer furnace by means of oxygen-enriched air, whereby the mass flow of hot combustion waste gases available for the indirect heat exchange with water/vapor streams is reduced. Furthermore, it is proposed to use the heat quantity transmitted by indirect heat exchange against hot synthesis-gas product gas or hot combustion waste gases for overheating a vapor stream which subsequently is utilized for energy generation in a steam turbine. The energy obtained thereby in turn can be used for oxygen generation or oxygen enrichment of the combustion air. What is disadvantageous here is the expensive plant concept.

A similar approach for minimizing the steam export is adopted in the patent specification EP 2103569 A2. Beside the largely complete consumption of the generated steam within the reformer, the cooled synthesis-gas product gas is supplied to a pressure swing adsorption in which carbon dioxide is separated. The obtained product gas of the pressure swing adsorption, which is enriched in hydrogen and therefore has an increased calorific value, is partly recirculated to the reformer furnace and used there as fuel. This is disadvantageous, because the valuable product hydrogen generated at high cost merely is thermally utilized by combustion.

In Hydrocarbon Engineering (2001), 6(8), pp. 47-50, Grant et al. describe a novel steam reforming plant for hydrogen production as well as the problems occurring in its construction as regards the environmental requirements to be observed and the limitation of the erection site. It is stated that by employing a novel type of reformer in combination with a pre-reformer unit for example a reduction of the export steam could be achieved.

The opposite case, however, in which a stable, high export steam quantity also becomes possible with a variable load condition or partial load operation of the steam reformer, so far has not been considered in the prior art. Especially this mode of operation, however, is relevant in integrated industrial complexes, in which the steam reformer is embedded in numerous adjacent plants consuming export steam. Here, a stable release of export steam is of high importance for the economy of the entire process. Due to the above-described disadvantages there is furthermore a demand for an alternative method, in which even in full load operation of the reformer the export steam quantity released can at least temporarily be decreased.

The recirculation of a part of the flue gas which is obtained by combustion of the burner feedstock in the burners of the reformer furnace to the burners is a measure used in the steam reformation of hydrocarbons. In the German laid-open publication DE 2513499 A, for example, a novel reformer furnace is proposed, in which the heat transmission to the reformer tubes substantially is effected only by convection and only for a minor part by thermal radiation. Beside other constructive measures, this is achieved in that a part of the flue gas is recirculated to the furnace after an optional re-compression, mixed with fuel and combustion air, and recirculated to the burners. The partial recirculation of the flue gases to a combustion furthermore is a known measure in the combustion power plant technology, where it is employed for reducing the emission of CO and nitrogen oxides.

SUMMARY

In an embodiment, the present invention provides a method for producing a synthesis-gas product gas and at least one product vapor stream includes catalytic steam reforming a hydrocarbonaceous feedstock in a steam reformer with variable production capacity of the synthesis-gas product gas so as to form the synthesis-gas product gas and the at least one product vapor stream. The steam reformer includes a plurality of catalyst-containing reformer tubes and a reformer furnace with burners for firing the reformer tubes. The hot synthesis-gas product gas stream is cooled in at least one heat exchanger by indirect heat exchange against a stream of water so as to form a cooled synthesis-gas product gas stream and a first partial vapor stream. The first partial vapor stream is supplied to the product vapor stream. The reforming furnace is operated so as to include:
(a) supplying a burner feedstock including fuel, combustion air and at least one flue gas recirculation stream to the reformer furnace,
(b) burning the burner feedstock in the burners so as to form a hot flue gas stream,
(c) cooling the hot flue gas stream in at least one heat exchanger by indirect heat exchange against a stream of water so as to form a cooled flue gas stream and a second partial vapor stream which is supplied to the product vapor stream, and
(d) separating the cooled flue gas stream into a flue gas waste gas stream and at least one flue gas recirculation stream, the flue gas recirculation stream being recirculated to step (a).
The mass flow of the recirculated flue gas is increased with decreasing mass flow of the synthesis-gas product gas so as to obtain an at least approximately constant product vapor stream by increasing the second partial vapor stream.

In another embodiment, the present invention provides a method for producing a synthesis-gas product gas and at least one product vapor stream includes catalytic steam reforming a hydrocarbonaceous feedstock in a steam reformer so as to form the synthesis-gas product gas and the at least one product vapor stream. The steam reformer includes a multitude of catalyst-containing reformer tubes and a reformer furnace with burners for firing the reformer tubes. The hot synthesis-gas product gas stream is cooled in at least one heat exchanger by indirect heat exchange against a stream of water so as to form a cooled synthesis-gas product gas stream and a first partial vapor stream. The first partial vapor stream is supplied to the product vapor stream. The reforming furnace is operated so as to include:
(a) supplying a burner feedstock including fuel, combustion air and at least one flue gas recirculation stream to the reformer furnace,
(b) burning the burner feedstock in the burners so as to form a hot flue gas stream,
(c) cooling the hot flue gas stream in at least one heat exchanger by indirect heat exchange against a stream of water so as to form a cooled flue gas stream and a second partial vapor stream which is supplied to the product vapor stream, and
(d) separating the cooled flue gas stream into a flue gas waste gas stream and at least one flue gas recirculation stream, the flue gas recirculation stream being recirculated to step (a).
The mass flow of the recirculated flue gas is decreased with a constant mass flow of the synthesis-gas product gas so as to obtain a decreased product vapor stream by decreasing the second partial vapor stream.

In another embodiment, the present invention provides a method for producing a synthesis-gas product gas and at least one product vapor stream includes catalytic steam reforming a hydrocarbonaceous feedstock in a steam reformer with variable production capacity of the synthesis-gas product gas so as to form the synthesis-gas product gas and the at least one product vapor stream. The steam reformer includes a multitude of catalyst-containing reformer tubes and a reformer furnace with burners for firing the reformer tubes. The hot synthesis-gas product gas stream is cooled in at least one heat exchanger by indirect heat exchange against a stream of water so as to form a cooled synthesis-gas product gas stream and a first partial vapor stream. The first partial vapor stream is supplied to the product vapor stream. The reforming furnace is operated so as to include:
(a) supplying a burner feedstock including fuel, combustion air and at least one flue gas recirculation stream to the reformer furnace,
(b) burning the burner feedstock in the burners so as to form a hot flue gas stream,
(c) cooling the hot flue gas stream in at least one heat exchanger by indirect heat exchange against a stream of water so as to form a cooled flue gas stream and a second partial vapor stream which is supplied to the product vapor stream, and
(d) separating the cooled flue gas stream into a flue gas waste gas stream and at least one flue gas recirculation stream, the flue gas recirculation stream being recirculated to step (a).
The mass flow of the recirculated flue gas is increased with constant mass flow of the synthesis-gas product gas so as to obtain an increased at least approximately constant product vapor stream by increasing the second partial vapor stream.

In another embodiment, the present invention provides a plant for carrying out one of the above methods.

DETAILED DESCRIPTION

In an embodiment, the present invention provides a method for steam reforming a hydrocarbonaceous feedstock, in which the production rates of the two products synthesis gas and export steam are uncoupled from each other. In particular, even in partial load operation of the steam reformation the full export steam quantity can be provided. In another embodiment, the invention provides a method with which in full load operation of the reformer the export steam quantity released can be decreased or further be increased.

In an embodiment, the present invention also provides a method in which the export steam quantity released can further be increased, even if the reformer already operates in full load operation.

It has now been found that the recirculation of a part of the flue gas surprisingly leads to a solution for a method for steam reforming a hydrocarbonaceous feedstock, in which the production rates of the two products synthesis gas and export steam are uncoupled from each other, when the size of the flue gas recirculation stream is adjustable and is related to the synthesis gas production capacity of the steam reformer. Synthesis gas production capacity is understood to be the mass flow of the synthesis-gas product gas.

In accordance with an embodiment of the invention, the mass flow of the recirculated flue gas can be increased with decreasing mass flow of the synthesis-gas product gas, for example in partial load operation of the reformer, in such a way that by increasing the second partial vapor stream a constant or approximately constant product vapor stream is obtained. In accordance with an embodiment of the invention, on the other hand, the mass flow of the recirculated flue gas can be decreased with a constant mass flow of the synthesis-gas product gas such that by decreasing the second partial vapor stream a decreased product vapor stream is obtained. In an alternative aspect of the invention it finally is provided that the mass flow of the recirculated flue gas is increased with a constant mass flow of the synthesis-gas product gas such that by increasing the second partial vapor stream an increased product vapor stream is obtained.

By the described aspects of embodiments of the invention, the export steam production is uncoupled from the synthesis gas production, which provides for an optimum flexibility of the steam quantity released.

When the steam reformer is operated under partial load, both the mass flow of the synthesis-gas product gas and the first partial vapor stream, which is generated by cooling the hot synthesis-gas product gas in a heat exchanger by indirect heat exchange against a stream of water, are decreased as compared to the normal operation. As a result, the entire steam quantity produced is decreased, which is composed of the first partial vapor stream and a second partial vapor stream, which is generated by cooling the hot flue gas in a heat exchanger by indirect heat exchange against a stream of water. To compensate the decrease in the steam production with a desired, constant product steam quantity or export steam quantity, the flue gas recirculation stream to the reformer furnace is increased such that by increasing the second partial vapor stream a constant or approximately constant product vapor stream is obtained. In accordance with the invention, this is achieved in that in the waste gas path of the flue gas after completed heat exchange and before entry into the waste gas disposal a partial flue gas stream is branched off and recirculated to the reformer furnace by means of an additional conveying device. Preferably, this partial flue gas stream is admixed to the combustion air stream at a suitable point. As a result, the flue gas mass flow leaving the reformer furnace is increased and as a result also the heat flow in the heat exchanger used for the steam production in the flue gas path. This measure provides for an increase in the steam production, so that by increasing the second partial vapor stream a constant or approximately constant product vapor stream is obtained.

To ensure a constant steam production in partial load operation of the reformer, the recirculated mass flow of the flue gas preferably is increased in an inversely proportional manner relative to the decreasing mass flow of the synthesis-gas product gas. By way of transition, it is even possible with the invention to maintain a constant steam production even when discontinuing the synthesis gas production by interrupting the supply of the hydrocarbonaceous feedstock to the reformer tubes. In this way, investments for an additional waste heat boiler and/or additional supporting burners for increasing the steam production in the flue gas path are saved. A further advantage of the invention consists in the decrease of the nitrogen oxide emissions due to the partial recirculation of the flue gases which contribute to an environmentally friendly operation of the steam reformer. In addition, calculations have revealed that the operation of the reformer furnace according to the invention as compared to the use of supporting burners is characterized by a higher energy efficiency and therefore by lower specific carbon dioxide emissions. The reliability of the plant operation of the steam reformer remains unaffected, since the method always can be carried out in a conventional way without recirculation of the flue gases in accordance with the invention.

When the steam reformer is operated under full load (normal operation), both the mass flow of the synthesis-gas product gas and the first partial vapor stream, which is generated by cooling the hot synthesis-gas product gas in a heat exchanger by indirect heat exchange against a stream of water, have standard values underlying the plant design. In accordance with the invention, a positive or negative change of the mass flow of the product vapor or the export steam quantity to be released then can be achieved by varying the flue gas recirculation stream to the reformer furnace. To increase the product vapor mass flow as compared to normal operation, the flue gas recirculation stream to the reformer furnace then is also increased. A decrease of the product steam mass flow as compared to normal operation is achieved by decreasing the flue gas mass flow recirculated to the reformer furnace. The last-mentioned measure, however, requires that in normal operation of the reformer the reformer furnace already is operated with flue gas recirculation, to ensure that a corresponding potential is present for decreasing the flue gas mass flow recirculated to the reformer furnace. In accordance with the invention, the flue gas recirculation to the reformer furnace in turn is realized such that in the waste gas path of the flue gas after completed heat exchange and before entry into the waste gas disposal a partial flue gas stream is branched off and recirculated to the reformer furnace by means of an additional conveying device.

Preferred Aspects of the Invention

The recirculation of the flue gas recirculation stream preferably is made possible by installation of an additional conveying device. Particularly preferably, the recirculation of the flue gas recirculation stream is effected by means of a conveying device with adjustable conveying capacity. For this purpose a controllable blower or a controllable compressor can be used.

To adapt the mass flow of the recirculated flue gas to the decreasing mass flow of the synthesis-gas product gas or to further increase or decrease the same in full load operation of the reformer in accordance with the invention, a blower with controllable conveying capacity is used particularly preferably. For adjusting the mass flow of the recirculated flue gas, a control valve downstream of a blower with fixed conveying capacity can alternatively also be used, wherein it then is recommendable to provide a bypass around the blower, in order to be able to operate the same with approximately constant inlet pressure.

Preferably, the incorporation of the additional conveying device in the waste gas path of the flue gas is effected after completed heat exchange and before entry into the waste gas disposal. Particularly preferably, the additional conveying device is arranged on the pressure side of an already existing flue gas blower.

In operation of the reformer plant with partial recirculation of the hot flue gases it is recommendable in principle to design the heat exchangers in the flue gas path for higher operating temperatures. This can be effected for example by selecting a construction material for these heat exchangers which is more resistant to high temperatures.

In preferred embodiments it is provided to add the recirculated flue gas to the combustion air. In this way, a particularly good mixing of the recirculated flue gas with the combustion air is achieved; this promotes the uniform combustion of the burner feedstock. Further aspects of the invention provide that the flue gas recirculation stream is added to the combustion air before and/or after preheating the same. Particularly preferably, the flue gas recirculation stream is added to the combustion air distributed over several points of addition. In this way, the temperature control of the flue gas/combustion air stream can be optimized and the energy efficiency of the method can further be increased.

In accordance with a particularly preferred embodiment of the invention, the recirculated flue gas is added to the preheated combustion air. In this way, the flue gas cooled upon heat exchange is preheated before addition to the burner feedstock, whereby the energy efficiency of the method is improved. In the case of a multistage preheating of the combustion air, the addition can be effected after each preheating stage, but also distributed over several preheating stages.

To provide for a rather timely and automatic adaptation of the recirculated flue gas stream to changes in the synthesis-gas product stream or the first partial vapor stream in particular when carrying out the method according to claim 1, it is provided in accordance with a development of the invention to provide a regulation acting on the additional conveying device, which employs the mass flow of the synthesis gas and/or of the first partial vapor stream as control variable, and which employs the setpoint for the flue gas mass flow and/or for the second partial vapor stream as reference variable. In accordance with a further development of the invention it is provided to adapt the combustion air mass flow to the recirculated flue gas mass flow by means of a regulation, in order to be able to perform the combustion with an optimum excess of air even in burner operation with flue gas recirculation.

The regulation then can also be used to automatically increase the steam/carbon ratio in partial load operation, by overproportionally increasing the steam content in the reformer feedstock relative to the hydrocarbon content. This measure furthermore effects a cooling of the heat exchanger(s) in the flue gas path with the simultaneously increased flue gas mass flow due to the recirculation of the flue gas. As a result, the thermal stress of the material of the heat exchanger(s) is reduced. A similar protective effect for the heat exchanger(s) in the flue gas path also can be achieved by installing a first, possibly easily exchangeable preliminary heat exchanger, through which the hot flue gases flow upon leaving the reformer furnace. By indirect heat exchange against a stream of water, the preliminary heat exchanger can be used for steam generation or against a vapor stream for overheating the same. The generated or overheated steam can be added to the second partial vapor stream.

A further protective measure for the heat exchangers in the flue gas path consists in using the reformer feedstock to be preheated as heat exchange medium, wherein between the heat exchanger stages quenching is effected with cold reformer feedstock (inter-stage quench).

In an embodiment, the present invention also relates to a plant for the steam reformation of a hydrocarbonaceous feedstock by releasing export steam. It is characterized by a reformer furnace with burners and a multitude of catalyst-containing reformer tubes,
at least one heat exchanger for cooling a hot synthesis-gas product gas stream by indirect heat exchange against a stream of water by forming a cooled hot synthesis-gas product gas stream and a first partial vapor stream,
a measuring device for measuring the mass flow of the synthesis-gas product gas,
at least one heat exchanger for cooling a hot flue gas stream by indirect heat exchange against a stream of water by forming a cooled flue gas stream and a second partial vapor stream,
a measuring device for measuring the mass flow of the recirculated flue gas,
a measuring device for measuring the product vapor mass flow,
a conveying device with adjustable conveying capacity for recirculating the flue gas recirculation stream to the reformer furnace.

In a particular configuration of the plant it is provided to use a blower as conveying device.

Further developments, advantages and possible applications of the invention can also be taken from the following description of exemplary embodiments and the drawing. All features described and/or illustrated form the invention per se or in any combination, independent of their inclusion in the claims or their back-reference.

The FIGURE schematically shows a method in accordance with a preferred embodiment of the invention. The reformer furnace 1 contains a multitude of reformer tubes 2 filled with catalyst. Usually, the number of reformer tubes is several hundred; in the FIGURE, only four reformer tubes are shown for reasons of clarity. The catalyst used is a commercially available nickel-based reforming catalyst. Via conduits 3, 4, 5, 6 and 7, the reformer tubes are charged with preheated, hydrocarbonaceous natural gas as reformer feedstock. The inlet temperature of the reformer feedstock is 500° C. Prior to entry of the reformer feedstock into the reformer, steam is admixed to the same, so that there is a defined steam/carbon ratio of 3 mol/mol. After conversion of the feedstock in the reformer tubes, the gaseous reformer product containing hydrogen, CO and non-converted natural gas constituents is withdrawn via conduit 8 and collecting conduit 9 and cooled in the heat exchanger 10, wherein a cooled reformer product is obtained and withdrawn via conduit 11. Cooling is effected by indirect heat exchange against a stream of water supplied via conduit 12, from which a first partial vapor stream 13 is obtained by evaporation in the heat exchanger 10.

The reformer tubes are fired by means of a multitude of burners 14 which are mounted on the upper surface of the reformer furnace and directly fire the space between the reformer tubes. For reasons of clarity, only five burners are shown in the FIGURE. In the present example, the burners 14 are operated with natural gas as fuel, which is supplied to the burners via conduits 15, 16 and distribution conduits 17. The combustion air is supplied via conduits 18, 19, 20 and 21 and admixed to the fuel in conduit 16. For conveying the combustion air, the blower 22 is used.

In the reformer furnace 1, the heat transfer to the reformer tubes is effected by thermal radiation and convective heat transmission of the hot flue gases. After completed heat transmission, the flue gases enter into the waste heat part 23 of the reformer furnace 1. The conveyance of the flue gases through the waste heat part of the reformer furnace is effected in the suction draft of the blower 24. In the waste heat part of the reformer furnace, the further cooling of the flue gases is effected by a plurality of heat exchangers in the flue gas path, wherein the enthalpy of the flue gases is utilized for generating a second partial vapor stream and for the multistage preheating of the reformer feedstock and the combustion air. With respect to the steam generation, the heat exchanger 25 is shown in the FIGURE by way of example, in which the hot flue gases are cooled by indirect heat exchange against a stream of water supplied via conduit 26, wherein a vapor stream is generated, which is withdrawn as second partial vapor stream via conduit 27. Alternatively, the cooling of the flue gases in the heat exchanger 25 can be effected against a vapor stream, wherein superheated steam then is withdrawn via conduit 27. In the waste heat part 23 of the reformer furnace, further heat exchangers not shown in the FIGURE for reasons of clarity are provided, by means of which there is also generated steam which is added to the second partial vapor stream. The sum of the vapor streams generated in the waste heat part of the reformer furnace forms the second partial vapor stream.

After passing the heat exchangers 28 to 31 serving for preheating the reformer feedstock and the combustion air, the cooled flue gases leave the waste heat part of the reformer furnace via conduit 32 and are supplied to the flue gas disposal 34 via conduit 33 by means of the blower 24. The temperature of the flue gases discharged via conduit 33 still is 100 to 250° C. From conduit 33, a flue gas partial stream is withdrawn via conduit 35 by means of the blower 36 and via conduit 37 supplied to the combustion air stream in conduit 19. Alternatively, the flue gas partial stream also can be added to the preheated combustion air in conduits 20 or 21. The distributed addition to several of the conduits 19, or 21 also is possible, whereby the energy efficiency of the method and the temperature control of the gas mixture of combustion air and recirculated flue gas is further improved. The mass flow of the recirculated flue gas is between 0 and 60% of the maximum flue gas stream in full load operation of the reformer plant.

In accordance with an embodiment of the invention, a part of the cold reformer feedstock is withdrawn via conduit 38 and added as quench to the reformer feedstock preheated in the heat exchanger 29 and supplied via conduit 5. In this way, the thermal load of the downstream heat exchanger 28 operating at an elevated flue gas temperature is reduced.

NUMERICAL EXAMPLES

To illustrate the advantages of the method according to the invention, numerical examples are given in the following Table, in which important operating parameters of a reforming plant with different load conditions and flue gas recirculation ratios are compared with each other. The comparative example demonstrates the full load operation of the reformer with nominal hydrogen production without flue gas recirculation. Example 1 shows the conditions in full load operation of the reformer with partial recirculation of the flue gases according to an embodiment of the invention, Example 2 documents a partial load operation of the reformer with partial recirculation of the flue gases according to an embodiment of the invention. As can clearly be seen with reference to the operating data of the reformer plant or the reformer furnace indicated in the Table, the export vapor stream can be increased by 39% by recirculating 10% of the flue gases in full load operation of the reformer (Example 1). Alternatively, in partial load operation of the reformer the export vapor stream can virtually be kept constant or even slightly be increased as compared to the full load operation by recirculating 12% of the flue gases.

TABLE

Reformer operation with different load conditions and flue gas recirculation ratios.

| Quantity | Unit | Comp. Example (full load reformer, without recycle) | Example 1 (full load reformer) | Example 2 (partial load reformer) |
|---|---|---|---|---|
| Reformer feedstock | — | natural gas | natural gas | natural gas |
| Fuel | — | natural gas | natural gas | natural gas |
| Thermal efficiency | — | 1.17 | 1.15 | 1.16 |
| T reformer inlet | ° C. | 500 | 500 | 500 |
| T reformer outlet | ° C. | 870 | 870 | 870 |
| Steam/carbon ratio | mol/mol | 3.0 | 3.0 | 3.0 |
| Air excess combustion | % | 10 | 10 | 10 |
| T flue gas before waste heat part reformer furnace | ° C. | 1033 | 1069 | 1015 |
| T flue gas inlet steam generator | ° C. | 780 | 850 | 795 |
| T flue gas before blower 24 | ° C. | 138 | 144 | 151 |
| Flue gas stream | kmol/h | 7010 | 8836 | 7199 |
| Recirculated flue gas stream | kmol/h | 0 | 884 | 884 |
| Recirculation ratio flue gas | % | 0 | 10 | 12 |
| Hydrogen product stream | Nm³/h | 60000 | 60000 | 50000 |
| Export vapor stream | kg/h | 62900 | 87300 | 64600 |

Comparative example: Full load (nominal hydrogen production) without flue gas recirculation, Example 1: Full load with partial recirculation of the flue gases, Example 2: Partial load with partial recirculation of the flue gases

INDUSTRIAL APPLICABILITY

Embodiments of the invention thus provide an improved method for the steam reformation of a hydrocarbonaceous feedstock, which is characterized by its high flexibility with respect to the generation of export steam and which permits to provide an approximately constant product vapor stream even in partial load operation of the steam reformer, which can wholly or partly be released to external loads as export steam. Alternatively, the export steam quantity to be released can be decreased or further be increased with the invention in full load operation of the reformer. In addition, the recirculation of the flue gas to the burners in the reformer furnace leads to a reduction of the nitrogen oxide emissions and thus to a more environmentally friendly operation of the plant.

LIST OF REFERENCE NUMERALS

1 reformer furnace
2 reformer tubes
3 to 9 conduit
10 heat exchanger
11 to 13 conduit
14 burner
15 to 21 conduit
22 blower
23 waste heat part reformer furnace 24 blower
25 heat exchanger
26 to 27 conduit
28 to 31 heat exchanger
32 to 33 conduit
34 flue gas disposal (chimney)
35 conduit
36 blower
37 to 38 conduit

The invention claimed is:

1. A method for producing a synthesis-gas product gas and at least one product vapor stream, the method comprising:
   catalytic steam reforming a hydrocarbonaceous feedstock in a steam reformer with variable production capacity of the synthesis-gas product gas so as to form the synthesis-gas product gas and the at least one product vapor stream, the steam reformer including a plurality of catalyst-containing reformer tubes and a reformer furnace with burners for firing the reformer tubes;
   cooling the hot synthesis-gas product gas stream in at least one heat exchanger by indirect heat exchange against a stream of water so as to form a cooled synthesis-gas product gas stream and a first partial vapor stream; and
   supplying the first partial vapor stream to the product vapor stream, wherein the reforming furnace is operated so as to include the following steps:
   (a) supplying a burner feedstock including fuel, combustion air and at least one flue gas recirculation stream to the reformer furnace,
   (b) burning the burner feedstock in the burners so as to form a hot flue gas stream,
   (c) cooling the hot flue gas stream in at least one heat exchanger by indirect heat exchange against a stream of water so as to form a cooled flue gas stream and a second partial vapor stream which is supplied to the product vapor stream,
   (d) separating the cooled flue gas stream into a flue gas waste gas stream and at least one flue gas recirculation stream, the flue gas recirculation stream being recirculated to step (a), and
   increasing a mass flow of the recirculated flue gas with decreasing mass flow of the synthesis-gas product gas so as to obtain an at least approximately constant product vapor stream by increasing the second partial vapor stream.

2. The method recited in claim 1, wherein the flue gas recirculation stream is recirculated using a conveying device with adjustable conveying capacity.

3. The method recited in claim 1, further comprising adding the flue gas recirculation stream to the combustion air.

4. The method recited in claim 1, further comprising adding the flue gas recirculation stream to the combustion air at least one of before and after preheating the combustion air.

5. The method recited in claim 2, wherein the conveying device is a blower.

6. The method recited in claim 1, further comprising using the product vapor stream at least partly as export steam.

7. A method for producing a synthesis-gas product gas and at least one product vapor stream, the method comprising:
   catalytic steam reforming a hydrocarbonaceous feedstock in a steam reformer so as to form the synthesis-gas product gas and the at least one product vapor stream, the steam reformer including a plurality of catalyst-containing reformer tubes and a reformer furnace with burners for firing the reformer tubes;
   cooling the hot synthesis-gas product gas stream in at least one heat exchanger by indirect heat exchange against a stream of water so as to form a cooled synthesis-gas product gas stream and a first partial vapor stream; and
   supplying the first partial vapor stream to the product vapor stream, wherein the reforming furnace is operated so as to include the following steps:
   (a) supplying a burner feedstock including fuel, combustion air and at least one flue gas recirculation stream to the reformer furnace,
   (b) burning the burner feedstock in the burners so as to form a hot flue gas stream,
   (c) cooling the hot flue gas stream in at least one heat exchanger by indirect heat exchange against a stream of water so as to form a cooled flue gas stream and a second partial vapor stream which is supplied to the product vapor stream,
   (d) separating the cooled flue gas stream into a flue gas waste gas stream' and at least one flue gas recirculation stream, the flue gas recirculation stream being recirculated to step (a), and
   decreasing a mass flow of the recirculated flue gas with a constant mass flow of the synthesis-gas product gas so as to obtain a decreased product vapor stream by decreasing the second partial vapor stream.

8. The method recited in claim 7, wherein the flue gas recirculation stream is recirculated using a conveying device with adjustable conveying capacity.

9. The method recited in claim 7, further comprising adding the flue gas recirculation stream to the combustion air.

10. The method recited in claim 7, further comprising adding the flue gas recirculation stream to the combustion air at least one of before and after preheating the combustion air.

11. The method recited in claim 8, wherein the conveying device is a blower.

12. The method recited in claim 7, further comprising using the product vapor stream at least partly as export steam.

13. A method for producing a synthesis-gas product gas and at least one product vapor stream, the method comprising:
   catalytic steam reforming a hydrocarbonaceous feedstock in a steam reformer so as to form the synthesis-gas product gas and the at least one product vapor stream, the steam reformer including a plurality of catalyst-containing reformer tubes and a reformer furnace with burners for firing the reformer tubes;
   cooling the hot synthesis-gas product gas stream in at least one heat exchanger by indirect heat exchange against a stream of water so as to form a cooled synthesis-gas product gas stream and a first partial vapor stream; and
   supplying the first partial vapor stream to the product vapor stream, wherein the reforming furnace is operated so as to include the following steps:
   (a) supplying a burner feedstock including fuel, combustion air and at least one flue gas recirculation stream to the reformer furnace,
   (b) burning the burner feedstock in the burners so as to form a hot flue gas stream,
   (c) cooling the hot flue gas stream in at least one heat exchanger by indirect heat exchange against a stream of water so as to form a cooled flue gas stream and a second partial vapor stream which is supplied to the product vapor stream,
   (d) separating the cooled flue gas stream into a flue gas waste gas stream and at least one flue gas recirculation stream, the flue gas recirculation stream being recirculated to step (a), and
   increasing a mass flow of the recirculated flue gas with a constant mass flow of the synthesis-gas product gas so as to obtain an increased product vapor stream by increasing the second partial vapor stream.

14. The method recited in claim 13, wherein the flue gas recirculation stream is recirculated using a conveying device with adjustable conveying capacity.

15. The method recited in claim 13, further comprising adding the flue gas recirculation stream to the combustion air.

16. The method recited in claim 13, further comprising adding the flue gas recirculation stream to the combustion air at least one of before and after preheating the combustion air.

17. The method recited in claim 14, wherein the conveying device is a blower.

18. The method recited in claim 13, further comprising using the product vapor stream at least partly as export steam.

19. A plant for carrying out a method of producing a synthesis-gas product gas and at least one product vapor stream, the plant comprising:
 a reformer furnace with burners and a plurality of catalyst-containing reformer tubes;
 at least one heat exchanger for cooling a hot synthesis-gas product gas stream by indirect heat exchange against a stream of water by forming a cooled hot synthesis-gas product gas stream and a first partial vapor stream;
 a measuring device for measuring a mass flow of the synthesis-gas product gas;
 at least one heat exchanger for cooling a hot flue gas stream by indirect heat exchange against a stream of water by forming a cooled flue gas stream and a second partial vapor stream;
 a measuring device for measuring a mass flow of the recirculated flue gas;
 a measuring device for measuring a product vapor mass flow; and
 a conveying device with adjustable conveying capacity for recirculating the flue gas recirculation stream to the reformer furnace, the conveyingdevice being configured to at least one of:
  increase the mass flow of the recirculated flue gas with decreasing mass flow of the synthesis-gas product gas so as to obtain an at least approximately constant product vapor stream by increasing the second partial vapor stream,
  decrease the mass flow of the recirculated flue gas with a constant mass flow of the synthesis-gas product gas so as to obtain a decreased product vapor stream by decreasing the second partial vapor stream, and
  increase the mass flow of the recirculated flue gas with a constant mass flow of the synthesis-gas product gas so as to obtain an increased product vapor stream by increasing the second partial vapor stream.

20. The plant according to claim 19, wherein the conveying device is a blower.

* * * * *